Patented Feb. 2, 1937

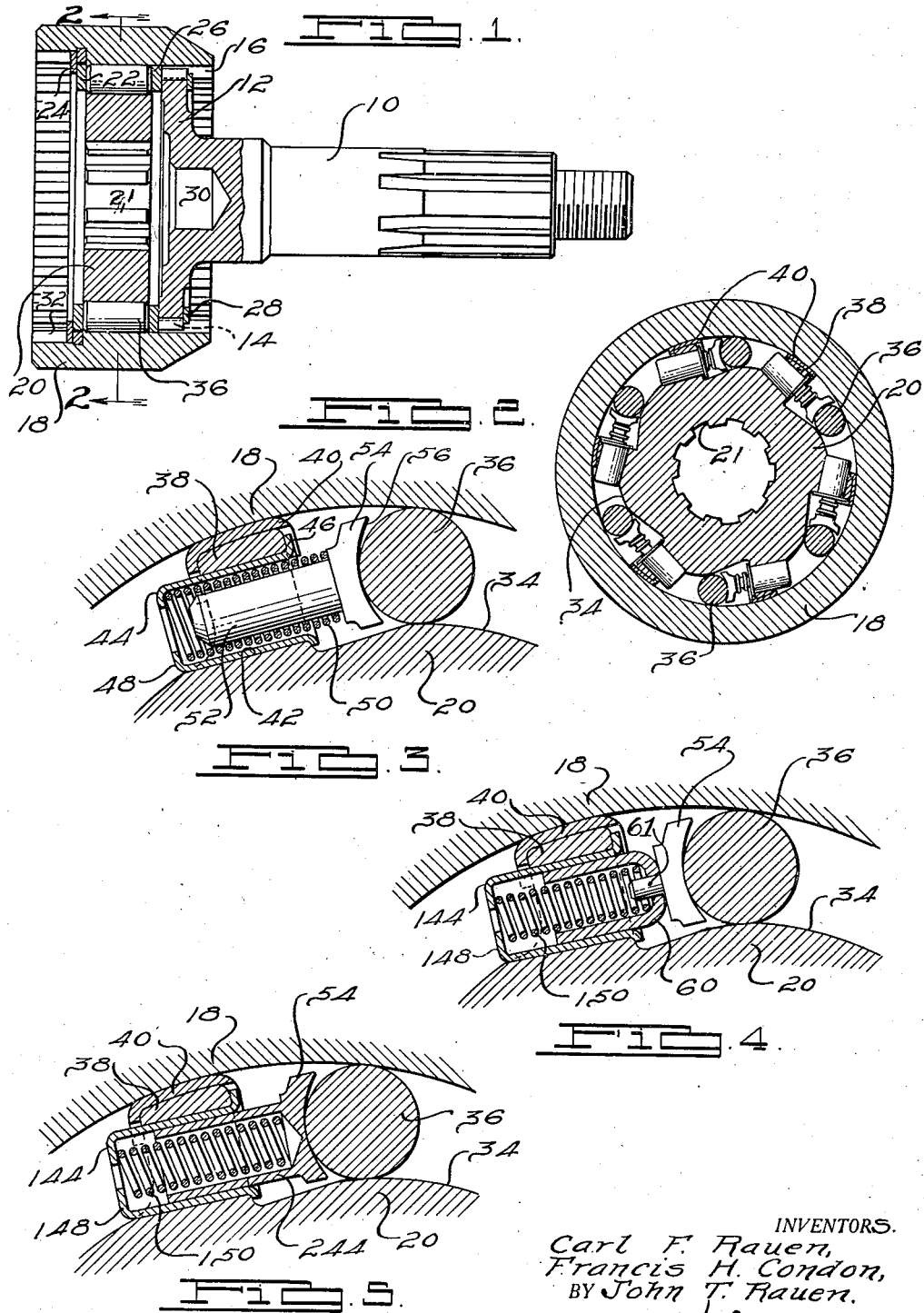

2,069,558

UNITED STATES PATENT OFFICE 2,069,558

FREEWHEELING CLUTCH

Carl F. Rauen, Grosse Pointe, and Francis H. Condon and John T. Rauen, Detroit, Mich.; said Condon and said John T. Rauen assignors, by mesne assignments, to Borg-Warner Corporation, a corporation of Illinois Application November 4, 1933, Serial No. 696,629

9 Claims. (Cl. 192—45)

This invention relates to overrunning clutches or, as they sometimes are called, unidirectional driving clutches, and in particular, relates to improvements in overrunning clutches of the roller type.

Overrunning clutches of this type, in general, comprise driving and driven members having a plurality of eccentric raceways formed between contiguous surfaces and a spring pressed roller in each of the raceways, biased toward the shallower end thereof, which are adapted to wedge between the surfaces of the raceways to lock the members together for rotation in one direction only. Rotation of the driving member in one direction relative to that of the driven member is adapted to hold the rollers out of wedging engagement with the opposed surfaces of the raceways and permit an overrunning action of the driven member. Elimination of the relative rotation above referred to will enable each of the rollers to be moved into wedging position between the opposed surfaces of the eccentric raceways so that the driven member will be driven by the driving member as soon as the rate of rotation of the driving member is subsequently accelerated.

This invention has particular relation to the mounting of the springs for biasing the rollers into wedging position. One of the principal objects of this invention is to provide an improved free wheeling clutch.

Another object of the invention is to provide a free wheeling clutch of the roller type in which it is possible to use a relatively greater number of rollers than has heretofore been possible in clutches of this type of known construction.

Other objects and advantages will appear from a reading of the following specification, with reference to the accompanying drawing, of which there is one sheet and in which:

Fig. 1 is a longitudinal view, partly in section, of a clutch drive assembly embodying the invention;

Fig. 2 is a cross sectional view of an overrunning clutch embodying the invention and taken substantially on the line 2—2 of Fig. 1;

Fig. 3 is an enlarged detail view, partly in section, of the assembly of one of the drive rollers illustrated in Fig. 2;

Fig. 4 is a similar view of a modification of the invention, illustrating a slightly different type of shoe assembly for the drive roller; and Fig. 5 is a similar view of a second modification of the invention, illustrating a slightly different form of shoe assembly for the drive roller.

Having reference now particularly to Figs. 1 and 2, there is shown a clutch drive assembly embodying the invention in which a shaft 10 may be provided and which is adapted to be connected to a source of power. One end portion of the shaft 10 is enlarged as at 12, and the periphery of the enlarged portion is provided with teeth or splines 14 which are adapted to mate with splines 16 internally provided on a shell 18. The shell 18 may be considered as the driving member of the overrunning clutch, since it is adapted positively to be driven by the shaft 10. The driven member 20 of the overrunning clutch comprises an annulus which is disposed within the shell 18 and confined therein by a washer 22 which is held in place by a snap ring 24. A washer 26 is disposed between the adjacent sides of the driven member 20 and the enlarged portion 12 of the shaft 10. Snap ring 28 cooperates with the snap ring 24 in holding the assembly together as a unit.

The driven member 20 of the overrunning clutch is internally splined as at 21 for engagement with a shaft (not shown) adapted to be driven from the driving shaft and the forward end of which shaft is adapted to be journaled in the counterbore 30 provided in the posterior end of the shaft 10. The driving member 18 of the overrunning clutch is provided, at its posterior end, with an internal set of teeth 32 which are adapted to cooperate with a clutch member (not shown) on the shaft, adapted to be driven for the purpose of driving the shaft positively from the shaft 10 instead of through the overrunning clutch. The periphery of the driven member 20 of the overrunning clutch is provided with a plurality of equidistantly spaced recesses, the surfaces 34 of which are eccentrically disposed with respect to the axis of rotation of the driven member 20. The eccentric surfaces 34 of the recesses and the opposed inner surface of the shell 18 provide a plurality of eccentric raceways between the contiguous surfaces of the driven and driving members of the overrunning clutch.

In each of the eccentric raceways there is disposed a roller 36, the diameter of which is slightly greater than the narrowest part of the raceway and is slightly less than the widest part of the raceways provided between the members 18 and 20. Between each of the recesses, the remaining portion of the driven member 20 forms a lobe 38 upon each of which is secured a cap 40 of suitable bearing material. The inner surface of the shell 18 is adapted to slide upon the caps 40 when the driving and driven members of the overrunning clutch rotate relative to each other. Each of the lobes 38 is provided with a bore 42 lying in a plane normal to the axis of rotation of the driven member 20 and in which is adapted to be pressed a thimble or cup-shaped shell 44.

Referring to Fig. 3, it will be seen that the cup-shaped member 44 has a snug fit within the bore 42 and that the rim of the member 44 is flared as at 46 to lie against the forward face of the lobe 38. The inner end of the cup-shaped member 44 is flared inwardly as at 48 to provide a seat for a spring 50 which is adapted to envelop the shank 52 of a shoe 54 and resiliently to support the same and bias the shoe out of the cup-shaped member 44. The spring 50 is closely fitted in the cup 44, and the shank 52 is closely fitted in the spring 50, so that the shoe is thereby guided in a fixed path. The surface 56 of the shoe is formed on a radius greater than that of the roller 36 to reduce the frictional contact between the roller and the shoe. As shown in Fig. 3, the roller 36 is in wedging position between the opposed surfaces of the raceway and is in frictional contact with a portion of the surface 56 of the shoe 54. When the driving member 18 of the overrunning clutch is rotating counter-clockwise with respect to the driven member 20, looking at Figs. 2 and 3, the roller 36 will roll upon the inner surface of the drum 18 and will be in engagement with a portion of the surface 56 of the shoe 54. At such time the roller 36 will not be in engagement with the eccentric surface 34 of the raceways or at least will not bear against the same. To secure this result the center of curvature of the shoe 54 may be located at a point on the side of a line which passes through the longitudinal axis of the shank of the shoe away from the axis of rotation of the cam member 20 of the clutch, so that the point of contact of the roller and the shoe will be on the side of the line opposite to that on which the center of curvature is located so that the spring will have a component of force tending to lift the roller off of the cam surface 34 during such time as the shell 18 is overrunning the cam member 20. However, as soon as the relative rotation of the driving member just referred to has been eliminated, the spring 50 will bias the roller 36 to wedging position where it will be in engagement with the opposed surfaces of the raceway.

In the device illustrated in Fig. 4, the shank of the shoe 54 comprises a plunger shell 60 which is slidably mounted within a cup-shaped member 144 similar in all respects to the cup-shaped member 44 illustrated in Fig. 3, with the exception that the inside end is provided with a greater flanged portion 148 to provide a seat for a spring 150 of a relatively small diameter which is confined between the cup-shaped member 144 and the plunger shell 60. The shell 60 is fixedly secured to an integral portion 61 of the shoe 54 for slidably supporting the same. This modification of the invention operates in exactly the same manner, as far as the free wheeling action of the overrunning clutch is concerned, as does the preferred embodiment illustrated in Fig. 3. In Fig. 5, the shoe 54 is provided with a hollow shank 244 between the inner end of which and a cup-shaped shell 144, a spring 150 is confined. The shell 144 is similar to shell 44 and is fixedly mounted within the bore of the lobe 38.

In finishing the eccentric surfaces of the raceways on the driven member, it is possible to polish the surface only up to a point approximately corresponding with the rear end of the cup-shaped member 44 on account of the radially projecting lobes 38. Normally it has been necessary to position the spring biasing the shoe 54, forward of the lobe 38, with the result that each roller and shoe therefor took up a proportionately greater extent of the peripheral space than does the construction illustrated in this application. The location of a portion of the spring over that portion of the eccentric surface which is not finished results in saving that amount of peripheral space and enabling a greater number of rollers to be positioned between the driving and the driven members of a free wheeling clutch than has heretofore been possible. It will be appreciated, of course, that when a relatively large number of rollers are used between the driving and the driven members, that the wear upon each individual roller will be reduced, with the result that the life of the clutch will be prolonged considerably.

Where a relatively small number of rollers are used, the rollers and the finished eccentric surfaces have a tendency to wear excessively due to the overload on the rollers, with the result that the life of the clutch unit is considerably shortened. It is essential for satisfactory operation of a free wheeling clutch, that the rollers and the finished eccentric surfaces do not appreciably wear, as this would render the clutch entirely unsatisfactory in operation, since one of the salient features of an overrunning clutch is its ability automatically to take up the drive instantaneously whenever the speed of the driving member of the clutch is increased to that of the driven member of the clutch.

The eccentric surfaces of the clutch members sometimes become grooved as a result of frictional engagement with the roller during rotation thereof when the driven member is overrunning. As a result thereof, the rollers tend to slip, rendering the operation of the clutch uncertain and unsatisfactory.

It will be noted that the shoe 54 is so supported that the forces which it exerts against the roller 36 on account of the pressure of the spring will always be in the same direction for the same relative position of the roller with respect to the face of the shoe 54, and that the shoe, on account of the curvature of its roller engaging surface, actually tends to hold the roller out of engagement with the eccentric surface of the raceway, particularly when the driven member is rotating. In constructions heretofore used, the rollers were sometimes pressed against the eccentric face of the driven member, as a result of the buckling of the spring, with the result that the finished eccentric surface of the driven member would become grooved.

While several specific embodiments of the invention have been illustrated and described, it must be appreciated that many modifications may be made in the construction thereof without departing from the scope of the invention, and for that reason we do not desire to be limited to any particular form or arrangement except in so far as such limitations are included in the following claims:

We claim:

1. In a device of the class described, the combination of two relatively rotating members, with means for locking said members against relative rotation in one direction comprising a plurality of eccentric raceways formed between oppositely disposed surface portions of said members and lying in the same path of rotation about the axis of one of said members, lugs projecting from one of said members and disposed one between each pair of said raceways, a roller in each of said raceways, each of said lugs being provided with a bore, a tubular member disposed within each of said bores, a shoe having a shank telescopically disposed with respect to said tubular member and adapted to engage said roller for guiding the same, said shank being supported within said tubular member to move along a definite path and means tending to project said shank out of said member for biasing said roller into wedging engagement between the oppositely disposed portions of said raceways, said roller being separable from said shoe.

2. An overrunning clutch of the type wherein rollers are disposed in eccentric raceways formed by oppositely disposed surface portions of the driving and driven members having lugs projecting from one of said members, there being one of said lugs disposed between each pair of said raceways, each of said lugs being provided with a bore, a shoe for each of said rollers and having a shank portion extending within said bore, and a spring in said bore in telescopic relationship with said shank portion and biasing said shoe for moving said roller into wedging position between the oppositely disposed surface portions of said raceways, said spring having a seat externally of said bore.

3. An overrunning clutch of the type wherein rollers are disposed in eccentric raceways formed by oppositely disposed surface portions of the driving and driven members having a plurality of lugs projecting from one of said members, one of said lugs being disposed between each pair of said raceways, each of said lugs being provided with a bore, a shell secured within each of said bores, each of said shells projecting into the restricted portion of the adjacent raceway, a shoe for each of said raceways and engaging the rollers therein and having a shank portion slidably mounted within said shell, and a spring disposed within each of said shells and adapted to bias said rollers toward the restricted end of said raceways for moving said rollers into wedging position between the oppositely disposed surfaces of said members.

4. An overrunning clutch of the class described, comprising in combination a driving member having a circular track, a member adapted to be rotated in one direction thereby and having a plurality of annularly spaced surfaces eccentric with respect to said circular track, lugs projecting from said driven member, one between each pair of said eccentric surfaces, each of said lugs being provided with a bore, a shell secured within said bore and overlapping a high portion of said eccentric surface, a roller disposed between each pair of said lugs and adapted to be moved into wedging position between said eccentric surfaces and said circular track, a shoe for each of said rollers and having a supporting member extending within said shell, and resilient means disposed within said shell and engaging said shoe for biasing said roller into wedging position.

5. An overrunning clutch comprising a driving member provided with a circular track, a driven member provided with a plurality of annularly spaced surfaces, oppositely disposed and eccentric with respect to said track, a plurality of lugs projecting from said driven member, there being one of said lugs between each pair of said surfaces, each of said lugs being provided with a bore, a roller disposed between each pair of said lugs and adapted to be wedged between said track and said eccentric surface, and a shoe for moving each of said rollers into wedging position, said shoes having a shank portion resiliently and slidably disposed within said bore in such a manner as to move in a fixed path, said shoe having a roller-engaging concave surface portion curved on a radius greater than that of said rollers and being adapted to support said rollers free from engagement with said eccentric surfaces during such time as said members are relatively moving in one direction.

6. An overrunning clutch comprising driving and driven members, a plurality of annularly spaced eccentric raceways provided between said members and formed by oppositely disposed surface portions of said members, a lobe disposed between each pair of said raceways and provided with a bore, a roller disposed in each of said raceways, and a shoe having a concave surface engageable with each of said rollers and provided with a shank portion resiliently disposed within said bore and in fixed longitudinal sliding relationship with respect thereto, the center of curvature of said shoe being offset with respect to the axis of said bore so that the shoe is adapted to support said roller free from engagement with the surface of one of said members during such time as said members are moving relative to one another.

7. An overrunning clutch having in combination a driving member, a driven member, a plurality of annularly spaced eccentric raceways disposed between said members and formed by oppositely disposed surface portions thereof, a roller disposed in each of said raceways, a dividing wall between each pair of said raceways and provided with a bore, a fixed member projecting from one end of said bore and projecting into a narrow portion of said raceways, a movable member projecting from the opposite end of said bore and carrying a roller engaging shoe, and a spring extending in telescopic relationship with said movable member and confined between said shoe and said fixed member for biasing said roller into wedging position between said raceways.

8. In an overrunning clutch, the combination of a driving member and a driven member, with means for locking said members against relative rotation in one direction comprising a plurality of eccentric raceways formed between oppositely disposed surface portions of said members and lying in the same path of rotation about the axis of one of said members, a dividing wall between each pair of said raceways and adapted to space said members, a roller in each of said raceways, and arcuately-shaped means adapted to move in a fixed path and associated with said dividing walls for biasing said rollers toward the restricted portion of said raceways and tending to hold said rollers out of engagement with one of the surface portions of said raceways during such time as said members are relatively moving.

9. Clutch structure comprising a pair of relatively movable members, a plurality of eccentric raceways formed between oppositely disposed surface portions of said members, lugs projecting from one of said members and disposed one between each pair of said raceways, a roller in each of said raceways, a shoe for each of said rollers, said shoes being supported by said lugs in such a manner as to move in a predetermined path, means acting on said shoes for biasing said rollers toward the restricted portions of said raceways for coupling said members for movement together in one direction, said shoes being arcuately shaped and adapted to move in a fixed path and to support said rollers free from engagement with one of said surfaces during such time as said members are moving relative to each other.

CARL F. RAUEN.
FRANCIS H. CONDON.
JOHN T. RAUEN.